H. W. BUNDY.
STEERING WHEEL.
APPLICATION FILED DEC. 26, 1919.
1,375,670.
Patented Apr. 26, 1921.
2 SHEETS—SHEET 2.
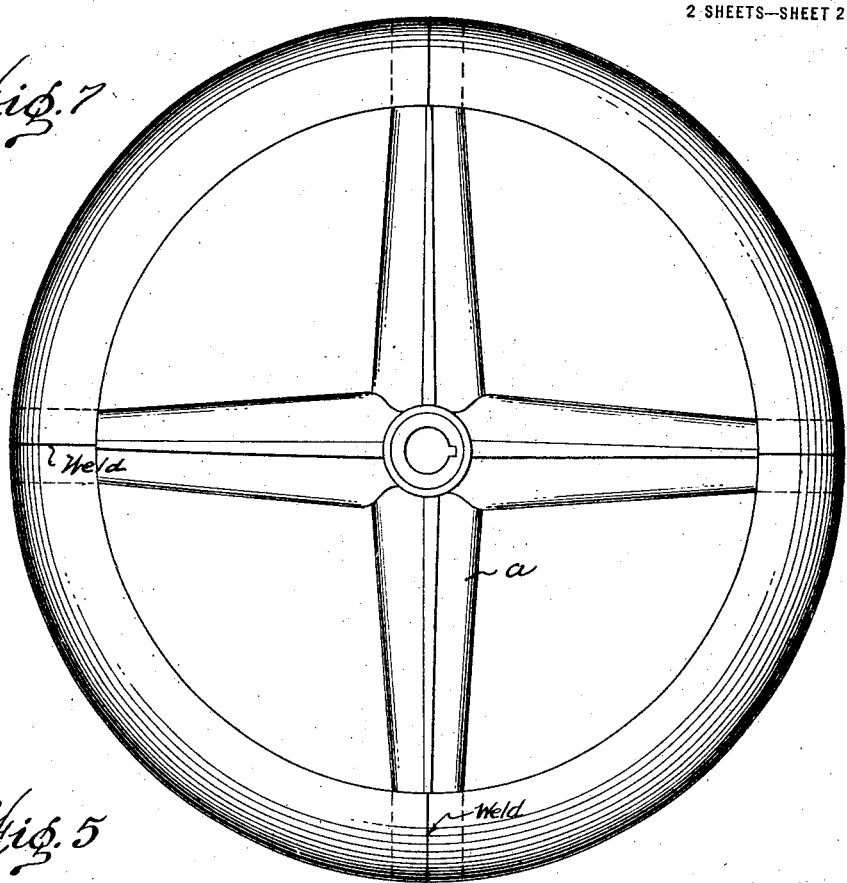
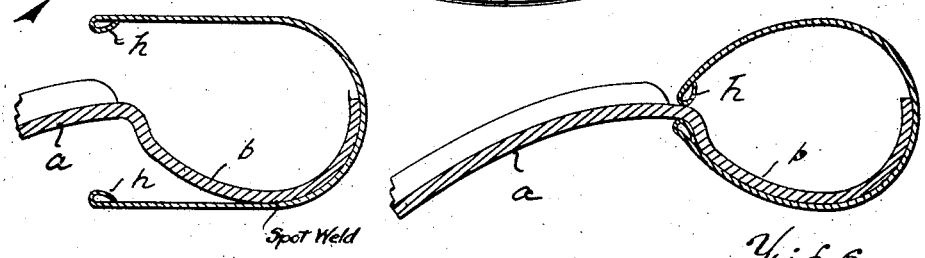
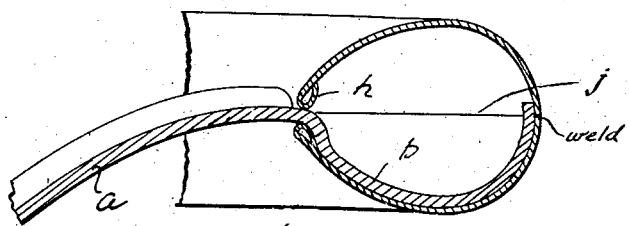
Inventor
Harry W. Bundy.
By Stuart E. Barnes
Attorney

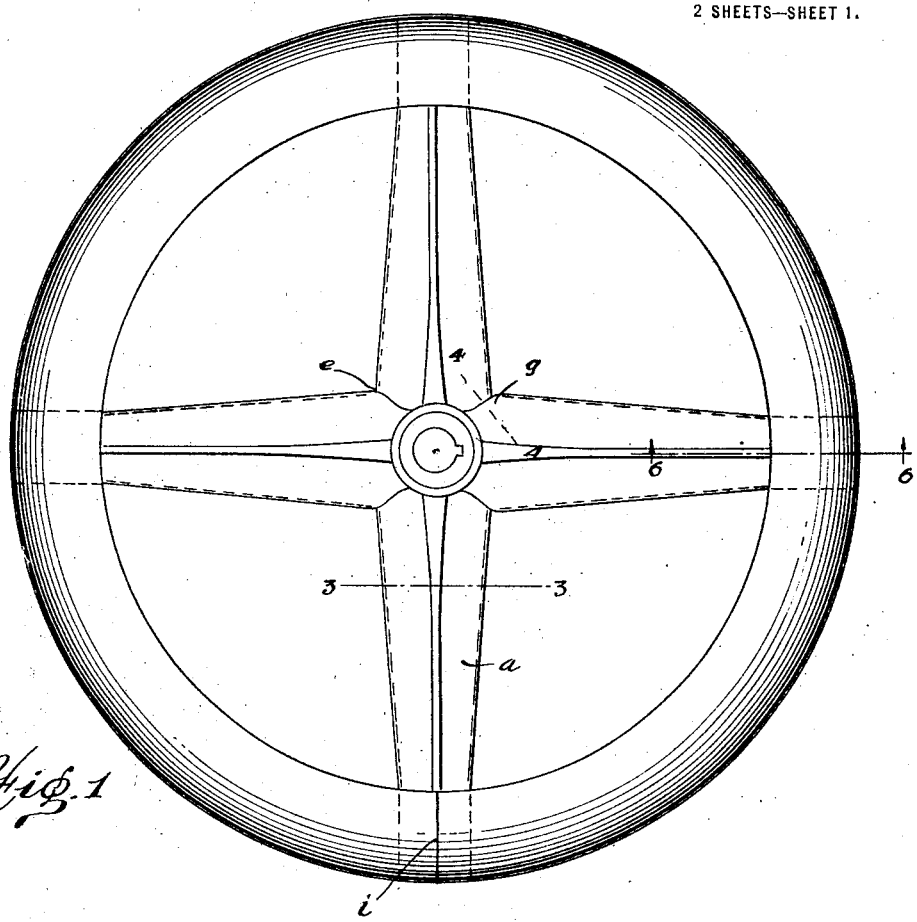
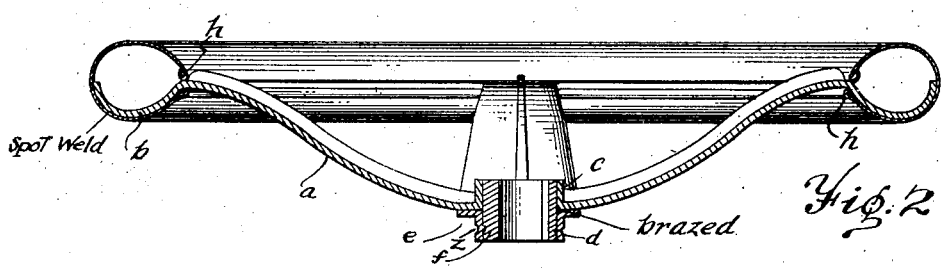
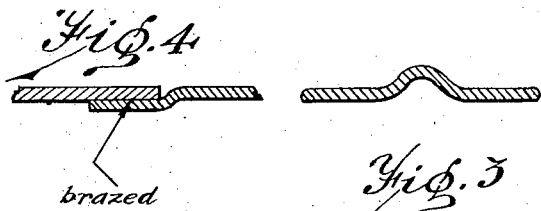

UNITED STATES PATENT OFFICE.

HARRY W. BUNDY, OF DETROIT, MICHIGAN.

STEERING-WHEEL.

1,375,670.  Specification of Letters Patent.  Patented Apr. 26, 1921.

Application filed December 26, 1919. Serial No. 347,263.

*To all whom it may concern:*

Be it known that I, HARRY W. BUNDY, a citizen of the United States, residing at Detroit, in the county of Wayne and State of Michigan, have invented certain new and useful Improvements in Steering - Wheels, of which the following is a specification.

This invention relates to steering wheels and has for its object a steering wheel made completely of metal parts with the exception of the hub. The claims also involve the method of constructing the wheel.

Heretofore it has been customary to make steering wheels usually with a cast metal spider and a laminated wood rim. However, the wood is hard to secure in reliable quantities and is also expensive. It is the object of the present invention to provide a steering wheel that can be quickly and easily manufactured from metal parts.

In the drawings,—

Figure 1 is a plan view.

Fig. 2 is a cross-section.

Fig. 3 is a section taken on the line 3—3 of Fig. 1.

Fig. 4 is a section taken on the line 4—4 of Fig. 1.

Fig. 5 is a section of the rim and outer end of the spider arm before the rim is pressed down in place.

Fig. 6 shows the rim pressed down in place.

Fig. 7 is a plan view of a modified form embodying a rim made up of four welded-together segments.

Fig. 8 is a cross section of the rim and outer end of the spider arm showing still a different modified form in which the rim is made up of two ring channels welded together.

The arms of the spider are made of straight strips centrally ribbed as shown in Fig. 3. The arms are designated $a$ and are given the usual taper from center to outside and the usual bow. The ends of the spider arms are flat in cross section instead of ribbed and are turned up into U shape in longitudinal cross-section, as shown in Fig. 2. There are two pairs of arms. One pair is provided with an upwardly-turned center boss $c$ and the other pair of arms is provided with a downwardly-turned center boss $d$ so that the two bosses form a seat for the hub $f$ that may be secured to the under boss by punching $z$. The center portions of the two pairs of arms are overlapped as shown in Fig. 2, the one pair running across the sheet from right to left, overlapping the pair shown at right angles thereto. The overlapping central portions $g$ of the two strips may be secured together by brazing, welding or riveting. The center hub $f$ is fitted into the two bosses. To get it accurately centered with the rim of the wheel, it is bored and slotted when assembled on the rim.

The rim is formed by any one of three ways, but preferably in the way shown in Figs. 1 to 6 inclusive wherein the piece of tubing is rolled or stamped in the form of a split tube with beads $h$ turned over on the meeting edges with the beads on the inside. This can be stamped or can be turned out of rolls in the form of a spiral of substantially the diameter of the wheel and can be cut in lengths to form the rim of the steering wheel. The tubing as it comes from the rolls or press will be of U cross section, as shown in Fig. 5. This allows it to be welded to the U-like ends of the steering arms. This is accomplished perfectly by spot-welding. Where the two ends of the tube meet as at $i$, they may be butt-welded. A press with suitable dies may then be used to crimp or turn the edges of the tube down upon each other as shown in Figs. 2 and 6 and hence complete the wheel. The crimped edges may be welded or otherwise secured to the spider arms.

If for any reason it is found that unsatisfactory results are secured by reason of attempting to crimp the inside edges of an entire circle, the rim may be made in four segments as shown in Fig. 7 and the ends of the segments butt-welded to each other after they have been crimped down.

Another way of making the rim is shown in Fig. 8. This would be a very satisfactory way but requires considerable welding as the rim is stamped in two channel rings which may be butt-welded together as at $j$ but the butt-welding has to be around the entire circumference of the rim.

What I claim is:

1. A hand wheel, comprising a rim, a spider formed of stamped strips forming pairs of stamped metal arms lapped over each other at the center and provided with bosses surrounding the central opening, and a hub secured in the opening and within the bosses.

2. In a hand wheel, a spider formed of single stamped strips forming pairs of stamped metal and ribbed arms with overlapping ring-like center portions secured together and punched to form center bosses, and a hub secured in the center bosses.

3. In a hand wheel, a spider formed of stamped strips forming pairs of stamped metal and ribbed arms, the overlapping central ring-like portions being secured together and the said overlapping pairs of arms being provided with registering central openings, and a hub secured therein.

4. The method of constructing a steering wheel spider which comprises stamping the spider arms out of sheet metal strips, punching the center to form bosses, and securing the arms together at the center.

5. The method of constructing a steering wheel spider, comprising stamping pairs of spider arms out of sheet metal, punching and bossing them at the center, lapping the arms at their center, and securing the hub to the bosses of the center.

6. A hand wheel, comprising a rim made up of a split tube having opposed edges turned inward, and a spider having a plurality of arms passing between the turned-in opposed edges of the rim member and secured to the said rim member.

7. A hand wheel, having in combination, a rim made up of a split tube having on its inside beaded edges that are opposed to each other, and a spider having a plurality of arms passing between the beaded edges and welded to the said rim member.

8. In a hand wheel, the combination of a rim constructed of a single piece of metal formed longitudinally into substantially a circle and folded cross-sectionally so as to form a split tube with opposed edges on the inside of the said circle, the ends of the said tube being homogeneously united to complete the circle, and spider arms having ends passing between the opposed edges of the split tube and secured to the same.

9. In a hand wheel, the combination of a plurality of spider arms having their outer ends extending substantially in the plane of and radially of the rim and the said rim comprising split tubing formed into a ring and split only on the inside of the ring where the opposed edges register and are rounded off, the said spider arm ends passing between the said opposed edges and being secured to the said rim.

In testimony whereof I affix my signature.

HARRY W. BUNDY.